J. D. COOPER.
VEHICLE TIRE.
APPLICATION FILED MAY 15, 1917.

1,325,233.

Patented Dec. 16, 1919.

Inventor.
J. D. Cooper
by A. J. S. Dennison
Atty.

UNITED STATES PATENT OFFICE.

JAMES D. COOPER, OF TORONTO, ONTARIO, CANADA, ASSIGNOR OF ONE-THIRD TO WILLIAM PARSONS, OF TORONTO, ONTARIO, CANADA.

VEHICLE-TIRE.

1,325,233.  Specification of Letters Patent.  Patented Dec. 16, 1919.

Application filed May 15, 1917. Serial No. 168,699.

*To all whom it may concern:*

Be it known that I, JAMES DIXON COOPER, a subject of the King of Great Britain, and resident of the city of Toronto, county of York, Province of Ontario, in the Dominion of Canada, have invented certain new and useful Improvements in Vehicle-Tires, as described in the following specification and illustrated in the accompanying drawings, that form part of the same.

The principal objects of the invention are to, eliminate the danger due to sudden deflation of pneumatic tires caused by punctures or blow outs, and to devise a tire which though punctured will maintain the load without excessive deformation and will not be subject to rim cutting.

A further and important object is to provide a tire which will retain its central alinement and rigidity even though partially or wholly deflated.

The principal feature of the invention consists in the novel construction of the tire, whereby the tread portion is supported in addition to the support of the side walls by a centrally arranged web which is divided at its inward side and supported by a central pressure chamber.

In the accompanying drawings, Figure 1 is a cross sectional view through a tire constructed in accordance with this invention showing the arrangement of the valve for the central air chamber.

Figure 1:
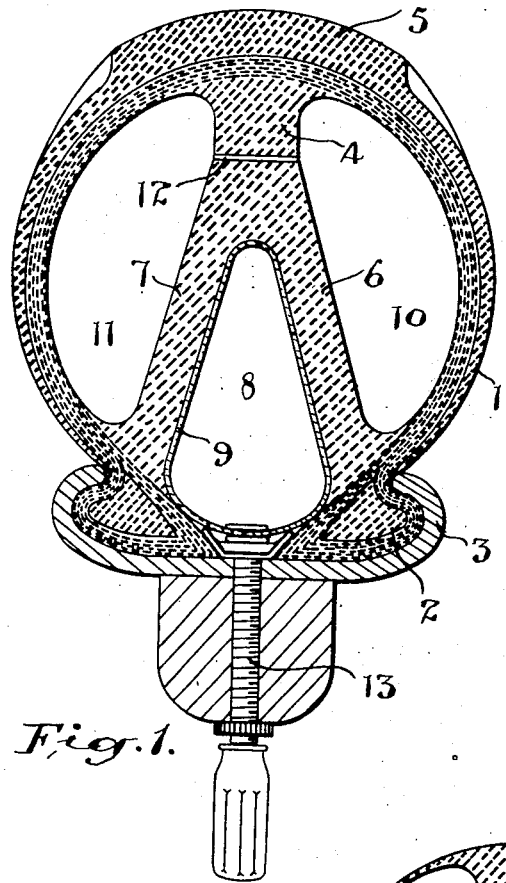
Figure 2:
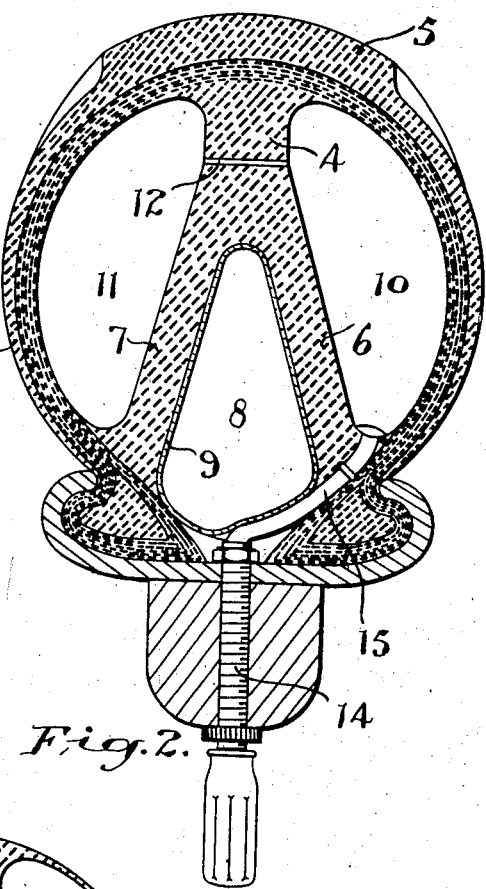
Fig. 2 is a cross sectional view of my improved tire showing the valve arrangement for inflating the outer or side portions of the tire.

My improved form of tire consists of an outer casing 1 which is here shown of the clencher pattern having the clencher beads 2 at the inner edge adapted to engage the side flanges of the rim 3 in locking contact and are adapted to be placed upon the rim in the usual manner, the edges being free to be sprung inwardly.

A central web 4 is molded integrally with the tread portion 5 of the tire and this web is divided centrally of its width and the divided members 6 and 7 are spread apart into an inverted V shape in cross section and the inward edges are integrally connected with the portions of the tire adjacent to the bead edges 2.

The divided webs 6 and 7 with the central web 4 are made of rubber material and of extremely heavy cross section and form a substantial support for the tread of the tire irrespective of any support which may be received by the air contained within the tire.

The webs 6 and 7 are sustained in their supporting position in addition to their own rigidity by the air pressure within the central chamber 8 which chamber is provided with an air tube 9 and is adapted to be inflated to high pressure after the tire is placed in position. The inflation of the tube 9 spreads the tire to its seat upon the rim and holds it rigidly and securely in place and provides a resilient backing for the central web 4.

The chambers 10 and 11 formed within the casing on each side of the central web 4 and webs 6 and 7 are closed between the said web and the outer wall of the tire and suitable communicating passages 12 are arranged through the web 4 forming communication between the said chambers. The central tube 9 is inflated through a valve 13 and a separate valve 14 is arranged in communication with the chambers 10 and 11, a tube 15 being suitably vulcanized into the casing and connected with the said valve.

The outer chambers 10 and 11 are supported substantially by the center chamber 8 and webs 6 and 7 and are inflated to a desirable pressure. The central tube is inflated separately and preferably to a much higher pressure than the side chambers. The pressure in the central chamber sustains the webs 6 and 7 under extremely heavy load in their normal central position allowing lateral flexure on the tire surface encountering abrupt obstacles in the way and therefore insuring great resiliency. The pressure in the outer chambers is comparatively low but maintains the outer portion of the tire in its full and proper shape under working conditions.

In the event of any sharp obstacle striking the tire surface it may enter the side walls and cause the deflation of the side chambers but the resistance to any obstacle entering directly through the center and therefore through the web 4 is practically impossible owing to its extreme depth, the consequence of this being that the inner central air chamber is effectively protected against deflation by puncture and even though a puncturing element may enter the outer side walls of the casing such obstruction would be deflected upon encountering the sloping side walls of the webs 6 and 7.

The central air pressure will be maintained in spite of almost any condition which might occur and the tire will consequently have the full support of the central webs and it will therefore be prevented from collapsing and will sustain the load in a manner almost equal to that of full inflation. However in the event of this central chamber becoming deflated through any unforeseen cause the strength of the webs 6 and 7 is sufficient to maintain the rigidity of the tire under load against collapse. The tire will therefore be absolutely free from being rim cut and damaged in the event of a puncture occurring and the resultant danger through collapse of the tire will be entirely obviated.

It has been known previous to this invention to form tire casings with central webs of a resilient rubber material and in some cases these webs have been divided but so far as the applicant is aware no device has ever been produced in which the tire is capable of having the edge beads sprung inwardly to effect the release of the tire from the rim through deflation of a centralized air chamber which exerts an outward pressure upon the beads to hold them in their locked position and also sustains the divided portions of the supporting web.

Figure 3:
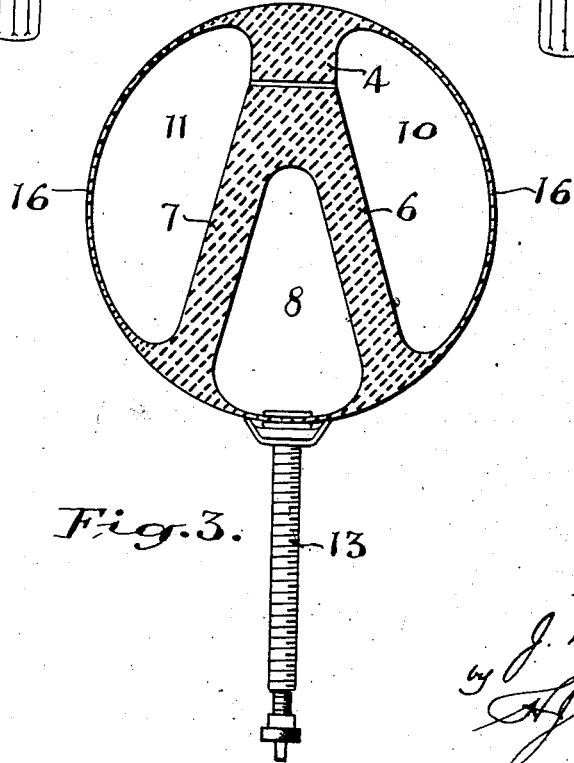
Fig. 3 is a cross sectional view showing a modified form of my invention to a separable tube.

The form shown in Fig. 3 is substantially the same as the device shown in Fig. 1 with the exception that the bifurcated webs 4, 6 and 7 form part of a complete air tube, the side walls 16 being formed integral with the web and completes the chambers 8, 10 and 11. The valve 13 is secured to the tube between the webs 6 and 7 at the inner side of the tube.

A tube constructed as described may be placed in an ordinary tire shoe or casing and will have the same resultant effect as if the webs 4, 6 and 7 were molded into the casing. The tire not only has qualifications of being practically proof against deflation by puncture but having the centralized substantially rigid portion, it has not the tendency to roll that other tires have and the result is that it is very effective against skidding.

The stretch of the tire is also reduced in stopping and starting and therefore the life of the tire is considerably lengthened and a much better traction is obtained than with the ordinary forms of tire even through the tread surface is smooth.

What I claim as my invention is:—

1. A tire, comprising an outer casing divided circumferentially on its inner periphery and having edge beads to engage the rim, a web of stiff rubber material extending inwardly from the tread portion of the casing and arranged in the median plane of the tire, said web being divided centrally of its width and the divided webs extending angularly outward in alinement with the edge beads and exerting a direct pressure under load against said beads to maintain them in locking engagement with the rim, said webs separating the tire into three circumferential chambers, and means for inflating said chambers.

2. A tire, comprising an outer casing divided circumferentially on its inner periphery and having edge beads to engage the rim, a web of stiff rubber material extending inwardly from the tread portion of the casing and arranged in the median plane of the tire, said web being divided centrally of its width and the divided webs extending angularly outward to engage and hold the beads in place, said beads being free at their inner edges, a central air tube adapted to exert an outward pressure against said beads and webs, and means for inflating said central tube.

J. D. COOPER.